United States Patent [19]

Stiefelmeyer et al.

[11] Patent Number: 4,595,864
[45] Date of Patent: Jun. 17, 1986

[54] METHOD OF GENERATING CURRENT PULSES FOR OPERATING A LIGHT-EMITTING DIODE AND CIRCUIT ARRANGEMENT FOR CARRYING OUT THE METHOD

[75] Inventors: Günther Stiefelmeyer, Bissingen-Teck; Konrad Langbein, Dettingen-Teck, both of Fed. Rep. of Germany

[73] Assignee: Leuze Electronic GmbH & Co., Owen-Teck, Fed. Rep. of Germany

[21] Appl. No.: 576,532

[22] Filed: Feb. 2, 1984

[30] Foreign Application Priority Data

Feb. 2, 1983 [DE] Fed. Rep. of Germany ....... 3303404
Jun. 28, 1983 [DE] Fed. Rep. of Germany ....... 3323243

[51] Int. Cl.[4] ........................................... H05B 37/02
[52] U.S. Cl. ............................ 315/246; 315/209 PZ; 315/276; 315/70; 310/355; 310/318; 310/319
[58] Field of Search .............. 315/209 PZ, 276, 290, 315/289, 70, 246; 362/800, 113; 310/345, 355, 319, 318; 434/21; 446/175

[56] References Cited

U.S. PATENT DOCUMENTS

| | | | |
|---|---|---|---|
| 3,582,692 | 6/1971 | Palini | 310/345 X |
| 3,938,262 | 2/1976 | Dye et al. | 434/21 |
| 4,048,489 | 9/1977 | Giannetti | 434/21 X |
| 4,078,187 | 3/1978 | Kanisawa et al. | 310/319 |

FOREIGN PATENT DOCUMENTS

| | | | |
|---|---|---|---|
| 2422115 | 11/1975 | Fed. Rep. of Germany | 315/246 |
| 2445505 | 8/1980 | France | 434/21 |

*Primary Examiner*—David K. Moore
*Assistant Examiner*—Vincent DeLuca
*Attorney, Agent, or Firm*—Michael J. Striker

[57] ABSTRACT

A light-emitting diode is energized by converting a mechanical energy by means of a piezoelectric element into electrical charges which are transformed in a transformer into current pulses sufficient for activating the light-emitting diode. The component parts of a device of this invention include a rotation-symmetrical housing enclosing a striking member which is spring-biased against an opening in the housing, a piezoelectric element cooperating with the striking member and having two opposite electrodes connected to a primary winding of a pulse transformer. The secondary winding of the transformer is connected to the leads of the light-emitting diode. The piezoelectric element is pressed against the compression spring of the striking member by a connection spring leading to a terminal of the primary winding. All component parts are aligned along the center axis of the housing.

10 Claims, 6 Drawing Figures

METHOD OF GENERATING CURRENT PULSES FOR OPERATING A LIGHT-EMITTING DIODE AND CIRCUIT ARRANGEMENT FOR CARRYING OUT THE METHOD

BACKGROUND OF THE INVENTION

The present invention relates in general to energization of light-emitting diodes and in particular it relates to a method of and a circuit arrangement for generating current pulses required for operating a light-emitting semiconductive diode.

In order to activate in a pulsating manner a semiconductive light-emitting diode (luminescent diode) a sufficient current pulse must be generated. It is known from prior art to produce current pulses of sufficient energy by storing electric current in a capacitor during the intervals between the pulses. The discharge of the stored energy has been triggered by a fast electronic switch, for example in the form of a thyristor.

Accordingly, the minimum expenditure for a pulse generator for activating a light-emitting diode must include a power source, a loading resistor, a storing capacitor, a thyristor, and a control generator for triggering the thyristor, in addition to the requisite circuit conduits.

SUMMARY OF THE INVENTION

A general object of the present invention is to provide an improved method of and a circuit arrangement for generating reference pulses required for the operation of a light-emitting semiconductive diode in which conventional power supplies inclusive of electrical storing and triggering members can be dispensed with.

An additional object of the invention is to provide such an improved pulse generator for light-emitting diodes which can be produced in the form of an independent, mobile, mechanically stable and low-volume unit.

A further object of the invention is to provide an improved current pulse generator for light-emitting diodes which permits operation of diodes emitting light both in the visible and invisible range in broader fields in comparison with standard power pulse sources.

In keeping with these objects and others which will become apparent hereafter, one feature of the invention resides, in a method of operating a light-emitting diode, in the steps of converting a mechanical stress or tractive force into a piezoelectrical signal, transforming the signal into a current pulse compatible with operational requirements of the diode, and activating the diode by said pulse. The circuit arrangement for generating the current pulses of this invention includes a piezoelectric element provided at two opposite surfaces with electrodes connected to a primary winding of a transformer, the piezoelectric element cooperating with a spring-biased mechanical striker whose mechanical energy is converted into an electric charge on the electrodes, and the secondary winding of the transformer being connected to the leads of the light-emitting diode.

One of the advantages of this invention can be seen for example in the possibility of employing contactors and switches in connection with an optical signal transmitter without the use of galvanic power supplies (passive detectors). Another field of application of this invention is in connection with optoelectric receiving devices and target disks by means of which numerous shooting processes can be simulated. A particular advantage of the latter application is that any participant can use his own weapon.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
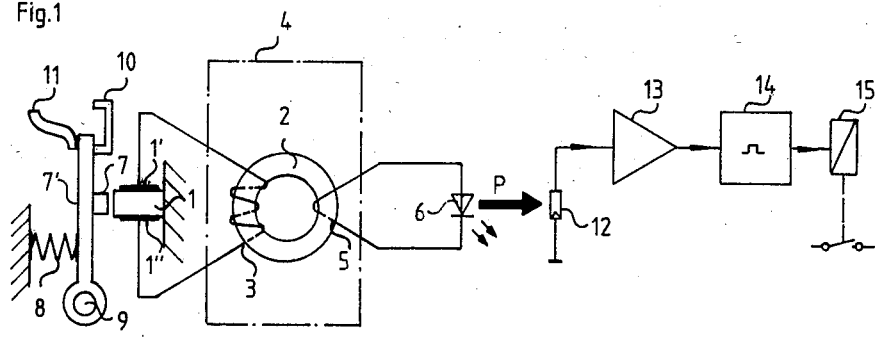
FIG. 1 shows an example of a circuit arrangement for carrying out the method of this invention.

The circuit arrangement according to FIG. 1 includes a piezoelectric element 1 such as a piezoelectric crystal provided at its opposite sides with electrodes 1' and 1" which are directly connected to a primary winding 3 of a pulse transformer 4. The transformer, apart from its primary winding, includes also a ferrite core 2 and a secondary winding 5. The terminals of the secondary winding 5 are directly connected to the leads of a semiconductive light-emitting diode 6.

A lateral side of the piezoelectric element 1 is arranged opposite a striking member 7 mounted on a lever arm 7' which is pivotally supported on an axle 9 and is biased by a pressure spring 8 (resilient force accumulator) against the piezoelectric element 1. The lever arm 7' of the striking member 7 is held by a step member 10 in its cocked position and upon release it can be returned to its cocked position by a reset level 11. The release of the striking member 7 as well as the resetting of the same into its cocked position can be made either manually or automatically by a suitable mechanical device which can be designed to operate in cycles. In this embodiment, the light-emitting diode 6 faces a light receiver 12, in the form of a phototransistor, a photodiode or any suitable light-converting element of this kind. The light receiver 12 is spaced apart from the diode 6 an appropriate distance and is connected to a pulse amplifier 13 the output of which is connected to a monostable multivibrator 14 and the like, which in turn operates a relay 15. Accordingly, after receiving a light pulse transmitted by the diode 6, a switching process is released.

The circuit arrangement of FIG. 1 operates as follows:

When the catch or stop member 10 is disengaged from the lever arm 7' of the striking member, the mechanical force stored in the compressed spring 8 is released and striker 7 immediately hits the piezoelectric element 1. Due to this instantaneous mechanical pressure applied to the piezoelectric element, a voltage is generated across the opposite electrodes 1' and 1", which is applied to the primary winding 3 of the pulse transformer 4 and induced to the secondary winding 5. The transformer ratio u of the transformer 4 is adjusted to the magnitude of the voltage applied to the primary side and to the intensity of current pulse required for activation of a particular light-emitting diode, under consideration of remaining parameters of the physical and electrical qualities of the employed component parts in the circuit. The piezoelectric generator 1 is selected such that the produced charge has an electric energy sufficient for exciting the light-emitting diode 6 to generate a corresponding light pulse. For instance, the ratio of the pulse transformer 4 u≈15 to 20:1, depending on the mechanical/electrical efficiency of the piezoelectric converter.

Figure 2:
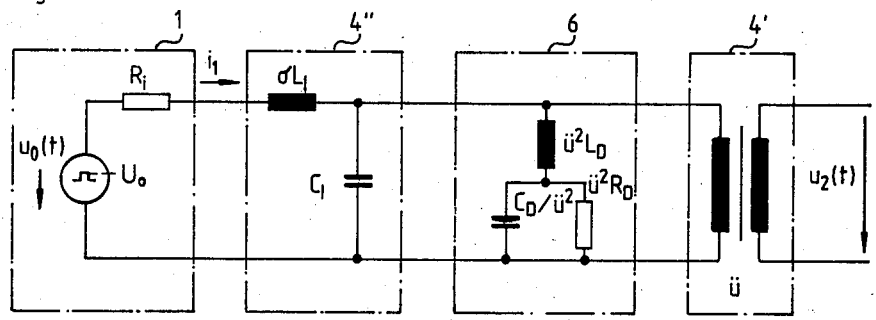
FIG. 2 is a simplified equivalent circuit diagram of the generating part operating during the time interval of the rising pulse.

Referring now to FIG. 2, reference character $u_0(t)$ denotes the EMF and $R_i$ denotes the internal resistance of the piezoelectric element 1. Reference numeral 4" indicates the stray inductance $\sigma_{L\,I}$ and the self-capacitance $C_I$ of the pulse transformer 4. Reference numeral 4' represents a symbol of an ideal transformer having a transformation ratio u and $u_2(t)$ applied to the light-emitting diode.

The light-emitting diode 6 is represented in this equivalent circuit by the supply side inductance $u^2 \cdot L_D$ transformed at the primary side of the transformer, the diffusion capacity of the pn-junction $C_D/u^2$, and the resistance $u^2 \cdot R_D$ of the barrier layer. In a further approximation, the light-emitting diode 6 is characterized by the linear approximation $R'_D$ of the magnitudes $R_D$, $C_D$ and $L_D$ for the entire switching process. The corresponding differential equation is a follows:

$$u_0(t) = R_i \cdot i_1 + \sigma_{LI} \frac{di_1}{dt} + u_2(t) \cdot u$$

wherein $i_I$ denotes current through the piezoelectric element.

The solution of this differential equation shows for the closing of the circuit:

$$u_2(t) = \frac{R'_D}{R_i + u^2 R'_D} U_0 \left[ 1 + \frac{\alpha_2}{\alpha_1 - \alpha_2} e^{\alpha_1 t} - \frac{\alpha_1}{\alpha_1 - \alpha_2} e^{\alpha_2 t} \right]$$

with $$\alpha_{1,2} = -\tfrac{1}{2}\left( \frac{R_i}{\sigma_{LI}} + \frac{1}{u^2 R'_D C_I} \right) \pm$$

$$\sqrt{\tfrac{1}{4}\left( \frac{R_i}{\sigma_{LI}} + \frac{1}{u^2 R'_D C_I} \right)^2 - \frac{R_i + u^2 R'_D}{u^2 R'_D} \cdot \frac{1}{\sigma_{LI} C_I}}$$

Thereby $\alpha_{1,2}$ designates a complex frequency.

When the following physical magnitudes are introduced:

$$\text{transformation factor: } A_u = \frac{u^2 R'_D}{R_i + u^2 \cdot R'_D}$$

-continued $$\text{period time: } \tau_A = \pm \sqrt{A_u \sigma_{LI} C_I}$$

$$\text{damping constant: } D_A = \tfrac{1}{2}(R_i/\sigma_{LI} + 1/u^2 R'_D C_I)\tau_A$$

then the result is $$\alpha_{1,2} = D_A/\tau_A \pm 1/\tau_A \sqrt{D_A^2 - 1}$$

In the case of a critical damping with $D_A = 1$, then the oscillating processes damp out most quickly and the following equation is valid:

$$\alpha_1 = \alpha_2 = -1/\tau_A$$

The solution of the differential equation is now as follows:

$$u_2(t) = A_u \frac{u_0}{u^2} [1 - (1 + t/\tau_A)e^{-t/\tau_A}]$$

wherein $$\tau_A = \sqrt{\sigma_{LI} C_I \frac{u^2 R'_D}{R_i + u^2 R'_D}}$$

The rise time $t_r$ between 10% and 90% of the final value of the output voltage $u_2(t)$ amounts to $$t_r = 3.35 \tau_A.$$

That is, for short rise times $\sigma_{LI}$ and $C_I$ must be kept low. A further shortening of the rise time is further made possible by increasing $R_i$.

Numerical Example:
Employed values: $R'_D \approx 0.7\Omega$; $R_i = 10^4 \Omega$; $u_2(t) = 2.1$ V; $i_2(t) = 3A$; $u^2 = 400$.

For a quantitative evaluation of the above equation it is assumed that the EMF of the piezoelectric element is constant during the time interval $4\tau_A = 0.4$ μs, that is, $U_0$ = constant.

$$\tau_A^2 = \sigma_{LI} C_I \frac{u^2 R'_D}{R_i + u^2 R'_D}$$

Insertion of numerical values yields:

$$10^{-14} s^2 = \sigma_{LI} C_I \frac{280}{10280} \rightarrow \sigma_{LI} C_I = 3.67 \cdot 10^{-3} s^2$$

The product of parasitic values of stray inductivity and self-capacitance thus lies in a realistic range of magnitude.

For $U_0$ it follows from the above described solution of the differential equation:

$$U_0 = u_2(t) \frac{u^2}{A_u} [1 - (1 + \tau/\tau_A)e^{-t/\tau_A}]^{-1}$$

and hence $$U_0 \approx 34 \text{ KV}$$

Figure 3:
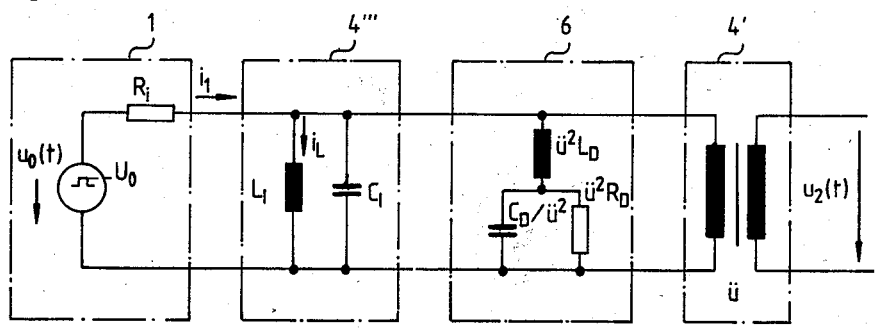
FIG. 3 is a simplified equivalent circuit diagram of the transmitting part for the time interval of the top part of a pulse.

The equivalent circuit according to FIG. 3 illustrates the behavior of the top part of a pulse and except the arrangement of parasitic parameters of the pulse transformer 4, corresponds to the circuit of FIG. 2. Since in this case the switch-on process is completed, the stray inductance $\sigma_{lI}$ can be ignored. Instead, the principal inductivity $L_I$ parallel to the self-capacitance $C_I$ must be considered. These magnitudes are indicated by block 4''' in the circuit of FIG. 3.

Assuming that $R_i$ and $R'_D$ are smaller than the resonance resistance value $\sqrt{L_I/C_I}$, the self-capacity $C_I$ is negligible. Accordingly, the differential equation when considering the aforementioned approximation for the light-emitting diode is $$u_0(t) = R_i i_L + \frac{R_i + R'_D}{R'_D} L_I \frac{di_L}{dt}$$

The solution of this equation is for the switching off process $$u_2(t) = \frac{u_0}{u^2} \cdot \frac{u^2 R'_D}{R_i + u^2 R'_D} e^{-t/\tau_D} = \frac{U_0}{u^2} A u e^{-t/\tau_D}$$

wherein $$\tau_D = \frac{R_i + u^2 R'_D}{R_i \cdot u^2 R'_D} L_I$$

The output voltage $u_2(t)$ decreases with the inclination of the top of the pulse defined by the $\tau_D$ and determines the width $t_B$ of the pulse. To increase the pulse width $t_B$ the main inductance $L_I$ must be increased.

The method of this invention is applicable in principle in those cases where the provision of a conventional power source for generating the requisite current pulses for a pulsating light-emitting diode is inconvenient or difficult, or when the use of a power supply cables interferes with the manipulation of the light-emitting devices. For example, this invention makes it possible to design a contactless limit switch provided with optical signal transmitters without the use of current conduits and operating without passive detectors. In the preferred embodiment the core 2 of the pulse transformer is in the form of a toroid.

Figure 4:
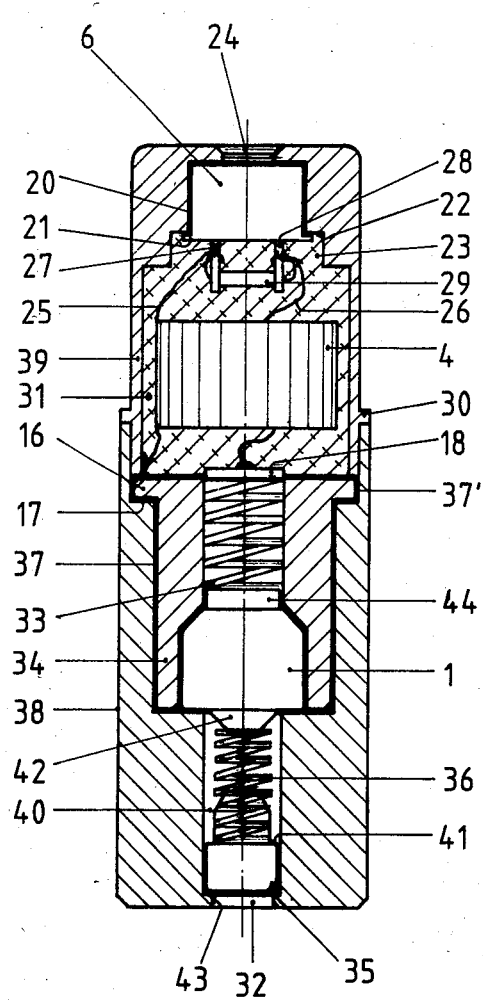
FIG. 4 is a sectional side view of a unit employing a self-contained pulsating power source for a light-emitting diode of this invention.

In the preferred embodiment of a power pulse supply unit for a light-emitting diode according to this invention, illustrated in FIG. 4, there are provided two axially aligned housing parts 38 and 39 connected one to another and enclosing all component parts (with the exception of a mechanical striking bolt for releasing the process) which are necessary for generation and transmission of a light pulse.

The lower housing part 38 is formed with two axially aligned bores 37 and 40, of which the bore 40 opening to the bottom of housing part 38 is reduced in diameter in comparison with the upper bore 37. In the lower bore 40 a striker 35 and a resetting spring 36 are arranged, whereby the striker is guided in axial direction against the spring force. The resetting or compression spring 36 is supported at one end on a shoulder 41 of the striker 35 and at the other end on a conical extension 42 at a bottom side of a piezoelectric element 1, the extension projecting into the upper part of the lower bore 40. The return movement of the striker 35 is limited by a flange 43 at the mouth of the bore 40 in the bottom of the housing part 38. The annular flange 43 constitutes an inlet opening for a non-illustrated striking pin. The piezoelectric element 1 is coated with a jacket of an electrically insulating material. The side of the piezoelectric element opposite the conical extension is formed with a cylindrical attachment 44 of smaller diameter and of a non-insulating material which engages one end of a contact spring 33. The other end of the latter is connected to a contact plate 18. The piezoelectric element or a column of such piezoelectric elements and the contact spring are inserted in a holding sleeve 34 which is effectively seated in the upper bore 37. The upper rim of the sleeve 34 is provided with a collar 16 resting on stop 17 of an enlarged portion 37' of the upper bore 7. It has been proved as advantageous when the end surface of the piezoelectric element 1 facing the striker and the corresponding abutment surface at the bottom of the bore 37 in the housing part 38 are provided with an elastic layer, for example in the form of an O-ring or the like.

The upper housing part 39, which in this example is inserted in the lower housing part 38 and firmly connected to the latter by gluing for example, houses the transformer 4 and the semiconductor light-emitting diode 6. One terminal of the input winding (primary winding) of the transformer is electrically connected to the contact plate 18 of the contact spring 33; the other terminal of the input winding is connected to the inner wall of the housing part 39, that is to the ground. The semiconductor light-emitting diode 6 or its housing is positively seated in bore portion 20 at the top of the upper housing part 39. The housing of the diode is formed with a collar-shaped abutment 21 which engages step 22 between the upper bore part 20 and an intermediate bore part 23. The top surface of the housing part 29 is provided with an exit opening 24 for the light rays of the diode 6. The two ends 25 and 26 of the output winding (secondary winding) of the transformer 4 are connected to terminals 27 and 28 of the light-emitting diode 6. The terminals of the diode 6 are further connected to a rectifying diode 29 which ensures that the semiconductor diode 6 is always supplied with pulses of correct polarity. A transformer 4 inclusive of its winding terminals, the terminals of the light-emitting diode 6 and of the rectifying diode 29 are preferably embedded in a cast plastic mass 31. The upper housing part 39 is formed at its lower end with a circumferential flange 30 which abuts against the annular top surface of the lower housing part 38. The connection between the housing parts 38 and 39 can be also a screw connection or the like.

With the exception of the rectifying diode 29, which can be arbitrarily oriented in the housing, all component parts as well as the inlet and outlet openings in the end walls of the housing parts 38 and 39 are symmetricall oriented about the longitudinal axis of the housing. Due to this aligned spatial arrangement of the component parts and the corresponding openings, a maximum utilization and functional arrangement of the unit is achieved.

Figure 5:
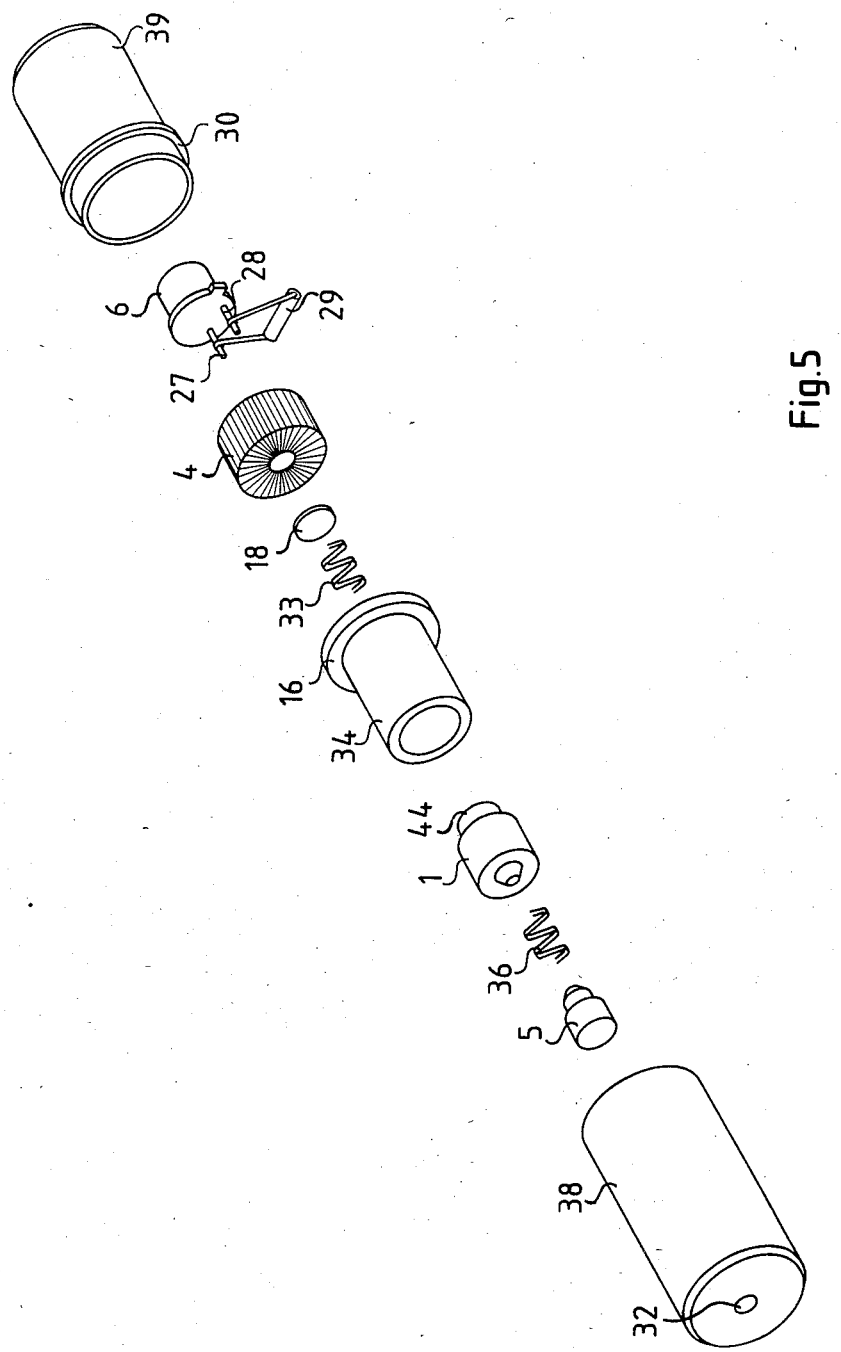
FIG. 5 is an exploded perspective view of the unit of FIG. 4.
Figure 6:
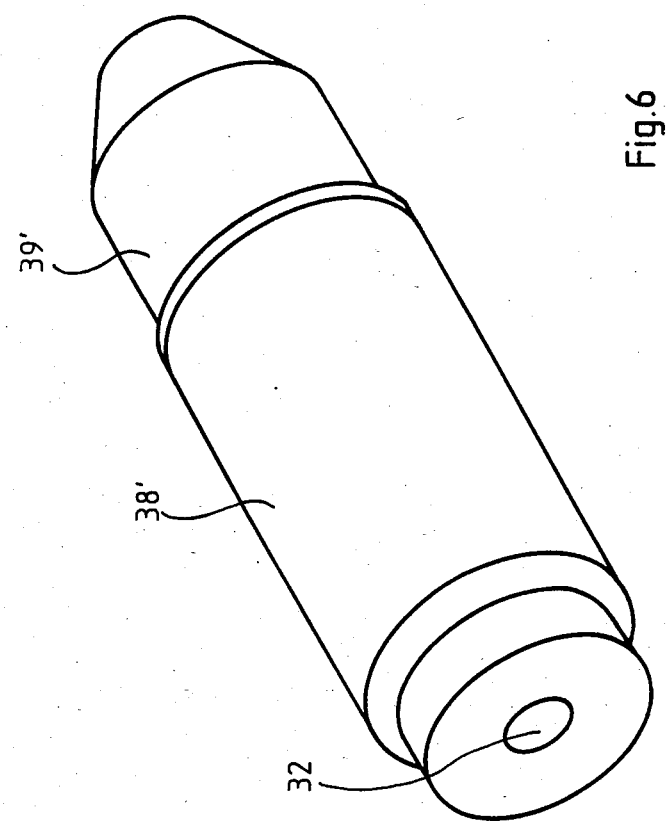
FIG. 6 is a perspective view of one embodiment of the housing of the unit of FIG. 5.

FIG. 5 illustrates in greater detail the spatial arrangement and configuration of respective structural elements. The reference numerals correspond to those of FIG. 4.

A modified version of the unit of this invention for an another field of application: In this embodiment the united housing parts 38' and 39' are configured in the form of a cartridge. This concept, when using standard dimensions, enables the unit of this invention to be inserted in the barrel of guns and employed for training purposes. The emitted light radiation is triggered by the impact of the striking pin of the weapon in question on the striker 35, which as explained before deforms the piezoelectric element to cause the latter to produce a voltage pulse of sufficient energy for exciting via the transformer 4 the light-emitting diode 6. This process simulating rounds of the weapon can be repeated by means of the same unit as many times as desired. The striker returns after each impact of a non-illustrated striking pin into its initial position by the action of return spring 36.

In using a suitable optoelectric receiver, for example in connection with a target disk, the unit of this invention enables a countless number of shooting simulations. It is of particular advantage that each participant in the training can use his own weapon. For adjusting the weapons to different ranges, there can be used appropriate optical lenses or lens systems which are disconnectably attached to the mouth of the barrel of the weapon in question. For example in the so-called combat shooting which takes place at distances from 5 to 6 m, a relatively large stray circle is desirable. Such a stray circle can be obtained in simple manner, so that a lens of a focal distance suitable for this range is attached to the mouth of the barrel.

In principle, the housing of the device of this invention can be shaped according to the requirements of an application. The most advantageous shape for the housing has proved to be a cylindrical or cartridge-like form.

It will be understood that each of the elements described above, or two or more together, may also find a useful application in other types of constructions differing from the types described above.

While the invention has been illustrated and described as embodied in a specific examples of a circuit arrangement for generating current pulses for light-emitting diodes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A device for actuating a light-emitting diode, comprising a piezoelectric body having two electrodes; means for mechanically striking said piezoelectric body; a pulse transformer having its primary winding directly connected to said electrodes and a secondary winding directly connected to a light-emitting diode to generate a current pulse energizing said light emitting diode when said mechanical striking means is operated.

2. A device as defined in claim 1 wherein said striking means includes a striking member movable against said piezoelectric body, and a resetting member for moving said striking member into a rest position.

3. A device as defined in claim 1 wherein said striking means includes a pressure transferring member resting on said piezoelectric body.

4. A device for actuating a light-emitting diode, comprising a tubular electrically conductive housing having two opposite ends each provided with an opening, a striking plunger arranged in said housing for movement in two opposite directions within said housing and being spring-baised against a limit stop in one of said openings, a piezoelectric body arranged in said housing in the path of movement of said striking plunger, said piezoelectric body having two opposite electrodes, a pulse transformer fixed in said housing at a spaced relation to said piezoelectric body, a contact spring of an electrically conductive material provided between said pulse transformer and said piezoelectric body, said pulse transformer having a primary winding directly connected via said contact spring to said electrodes and a secondary winding, a light-emitting diode installed at the other opening and having electrodes directly connected to said secondary winding, and a rectifying diode connected in parallel with said light emitting diode.

5. A device as defined in claim 4, wherein the housing has the shape of a cartridge insertable into the barrel of a gun for simulating a shooting process whereby a striking pin or bolt of the gun hits the striking plunger of the device through said one opening at one end of the housing.

6. A device as defined in claim 4, comprising a compression spring arranged between one side of said piezoelectric body and said striking plunger for biasing the latter against said limit stop, said contact spring resting on said piezoelectric body opposite said compression spring and being electrically connected between one of said electrodes and a terminal of said primary winding, the other terminal of said primary winding being directly connected to the other electrode of the piezoelectric element via said housing, and said openings, said striking plunger, said piezoelectric body, said pulse transformer, said springs and said light-emitting diode being aligned along a common center axis.

7. A device as defined in claim 6, wherein said housing is assembled of two rotation-symmetrical housing parts coaxial with said center axis and being connected one to another, said striking plunger, said compression spring and said piezoelectric body together with said contact and compression springs being provided in one housing kpart and the light-emitting diode and said pulse transformer being provided in said other housing part.

8. A device as defined in claim 7, wherein said piezoelectric body together with said contact springs are arranged in a cylindrical sleeve provided with a peripheral collar, said housing being formed with a central stepped bore, said sleeve being insertable into a bore portion of such a diameter in one housing part and said striking member together with said compression spring being guided in a bore portion of the one housing part having a smaller diameter.

9. A device as defined in claim 8, wherein said light-emitting diode is positively inserted in a bore portion of smaller diameter in the other housing part and the transformer together with winding terminals being embedded in a plastic mass and inserted in a bore portion of the other housing part having a larger diameter.

10. A device as defined in claim 9, further comprising an elastic intermediate arranged between a step in the one housing part and the side of said piezoelectric body facing said striking plunger.

* * * * *